US009372352B2

(12) United States Patent
Lim et al.

(10) Patent No.: US 9,372,352 B2
(45) Date of Patent: *Jun. 21, 2016

(54) LENS DRIVING DEVICE AND CAMERA MODULE INCLUDING THE SAME

(71) Applicant: SAMSUNG ELECTRO-MECHANICS CO., LTD., Suwon-Si (KR)

(72) Inventors: Soo Cheol Lim, Suwon-Si (KR); Chul Jin Kim, Suwon-Si (KR); Jae Hyuk Lee, Suwon-Si (KR); Sung Ryung Park, Suwon-Si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/311,210

(22) Filed: Jun. 20, 2014

(65) Prior Publication Data

US 2015/0055220 A1 Feb. 26, 2015

(30) Foreign Application Priority Data

Aug. 23, 2013 (KR) .......................... 10-2013-0100655
Mar. 14, 2014 (KR) .......................... 10-2014-0030647

(51) Int. Cl.
*G03B 13/36* (2006.01)
*G03B 17/00* (2006.01)
(Continued)

(52) U.S. Cl.
CPC .............. *G02B 27/646* (2013.01); *G02B 7/022* (2013.01); *G02B 7/09* (2013.01); *G03B 3/10* (2013.01); *G03B 5/00* (2013.01); *G03B 13/36* (2013.01); *H04N 5/2253* (2013.01); *H04N 5/2254* (2013.01); *H04N 5/2257* (2013.01);
(Continued)

(58) Field of Classification Search
CPC .......... G03B 13/36; G02B 27/646; G02B 7/09
USPC ........ 396/55, 133; 348/208.11, 345; 359/557, 359/824
See application file for complete search history.

(56) References Cited

U.S. PATENT DOCUMENTS 8,019,210 B2    9/2011  Uno et al.
8,810,714 B2 *  8/2014  Seol et al. ..................... 348/345
(Continued)

FOREIGN PATENT DOCUMENTS

EP    1 727 358 A2   11/2006
EP    2 840 770 A2   2/2015
(Continued)

OTHER PUBLICATIONS

Office Action dated Oct. 6, 2014 for Korean Patent Application No. 10-2014-0030647 and its English summary provided by Applicant's foreign counsel.
(Continued)

*Primary Examiner* — W B Perkey
(74) *Attorney, Agent, or Firm* — NSIP Law

(57) ABSTRACT

A lens driving device includes a lens barrel supporting a lens; an autofocusing driving unit disposed on one side of a plane perpendicular to an optical axis direction based on the lens barrel to thereby drive the lens barrel in the optical axis direction; and a hand-shake prevention driving unit disposed on sides of the plane perpendicular to the optical axis direction other than the one side on which the autofocusing driving unit is disposed, to thereby drive the lens in a direction perpendicular to the optical axis direction.

26 Claims, 12 Drawing Sheets

(51) Int. Cl.

| | |
|---|---|
| G02B 27/64 | (2006.01) |
| G02B 7/02 | (2006.01) |
| G02B 7/09 | (2006.01) |
| G03B 3/10 | (2006.01) |
| G03B 5/00 | (2006.01) |
| H04N 5/225 | (2006.01) |
| H04N 5/232 | (2006.01) |

(52) U.S. Cl.
CPC .......... *H04N 5/232* (2013.01); *H04N 5/23287* (2013.01); *G03B 2205/0015* (2013.01); *G03B 2205/0069* (2013.01)

(56) References Cited

U.S. PATENT DOCUMENTS

| | | | |
|---|---|---|---|
| 8,861,946 B2* | 10/2014 | Kim et al. ....................... | 396/55 |
| 2009/0060485 A1 | 3/2009 | Takahashi | |
| 2010/0290769 A1 | 11/2010 | Nasiri | |
| 2011/0236008 A1 | 9/2011 | Kang et al. | |
| 2012/0229901 A1 | 9/2012 | Moriya | |
| 2013/0016427 A1 | 1/2013 | Sugawara | |
| 2013/0162851 A1 | 6/2013 | Shikama et al. | |
| 2014/0009631 A1* | 1/2014 | Topliss ..................... | 348/208.11 |
| 2014/0098434 A1 | 4/2014 | Baik et al. | |
| 2014/0255016 A1* | 9/2014 | Kim et al. ....................... | 396/55 |
| 2014/0362284 A1* | 12/2014 | Shin et al. ..................... | 348/373 |

FOREIGN PATENT DOCUMENTS

| | | |
|---|---|---|
| EP | 2 852 148 A2 | 3/2015 |
| JP | 2011-065140 A | 3/2011 |
| JP | 2011-113009 A | 6/2011 |
| JP | 2013-24938 A | 2/2013 |
| JP | 2013-134455 | 7/2013 |
| KR | 10-2010-0035097 | 4/2010 |
| KR | 10-2011-0050161 | 5/2011 |
| KR | 10-2011-0106664 | 9/2011 |
| KR | 10-2014-0076213 A | 6/2014 |
| KR | 10-2015-0009697 A | 1/2015 |
| WO | WO/2014/092271 A1 | 6/2014 |

OTHER PUBLICATIONS

Korean Office Action issued May 14, 2015 in the corresponding Korean Patent Application No. 10-2014-0030647 (5 pages in English and 5 pages in Korean).

Office Action dated Mar. 25, 2015 for U.S. Appl. No. 14/609,849 (now published as US 2015/0138639).

Extended European Search Report issued on Dec. 9, 2015 in counterpart European Application No. 15163338.5 (8 pages in English).

Korean Office Action issued on Apr. 19, 2016 in counterpart Korean Application No. 10-2014-0030647 (18 pages in Korean with English translation).

* cited by examiner

LENS DRIVING DEVICE AND CAMERA MODULE INCLUDING THE SAME

CROSS-REFERENCE TO RELATED APPLICATIONS

This application claims the benefit of Korean Patent Application Nos. 10-2013-0100655 filed on Aug. 23, 2013 and 10-2014-0030647 filed on Mar. 14, 2014, with the Korean Intellectual Property Office, the disclosures of which are incorporated in their entireties herein by reference.

BACKGROUND

The present disclosure relates to a lens driving device having a hand-shake correction function used in a mobile communications terminal, and a camera module including the same.

A scheme of correcting a hand-shake by moving a lens in a direction perpendicular to an optical axis is referred to as a lens moving scheme, and a scheme of correcting a hand-shake by moving an image sensor in a direction perpendicular to an optical axis is referred to as an image sensor moving scheme.

That is, an optical image stabilization (OIS) technology is a technology capable of correcting the hand-shake by assigning relative displacement values to the lens and the image sensor in directions (X and Y directions) perpendicular to an optical axis direction (Z direction).

Referring to the following Patent Document 1, a magnet and a coil of an autofocus driving unit are formed to be symmetrical with respect to each other when viewed in a direction perpendicular to the optical axis, and a magnet and a coil of a hand-shake prevention driving unit are also symmetrical with respect to each other on four surfaces of a camera module.

Referring to the following Patent Document 2, there is disclosed a structure in which the autofocus driving unit and the hand-shake prevention driving unit share the magnet, but positions of the coils are formed to be symmetrical with respect to each other when viewed in a direction perpendicular to the optical axis.

Referring to the following Patent Document 3, there is disclosed a structure in which the coil of the autofocus driving unit also shares the magnet of the hand-shake prevention driving unit formed to be symmetrical with respect to each other on the four surfaces of the camera module.

RELATED ART DOCUMENT (Patent Document 1) Japanese Patent Laid-Open Publication No. 2011-113009
(Patent Document 2) Japanese Patent Laid-open Publication No. 2011-065140
(Patent Document 3) Korean Patent Laid-Open Publication No. 2011-0050161

SUMMARY

An aspect of the present disclosure may provide a lens driving device having an autofocus driving unit disposed on one side of a lens barrel and a hand-shake prevention driving unit disposed on the other sides of the lens barrel, and a camera module having the same.

An aspect of the present disclosure may also provide a camera module in which a lens driving device having an autofocus driving unit disposed on one side of a lens barrel and a hand-shake prevention driving unit disposed on the other sides of the lens barrel is wholly symmetrical based on a direction perpendicular to an optical axis.

An aspect of the present disclosure may also provide a camera module in which a lens driving device having an autofocus driving unit disposed on one side of a lens barrel and a hand-shake prevention driving unit disposed on the other sides of the lens barrel is wholly asymmetrical based on a direction perpendicular to an optical axis.

According to an aspect of the present disclosure, a lens driving device may include an autofocus driving unit disposed on one side and a hand-shake prevention driving unit disposed on the other sides when viewed in a direction perpendicular to an optical axis.

In a case in which the autofocus driving unit is disposed on one side of the camera module and the hand-shake prevention driving unit is disposed on the other two or three sides of the camera module, the number of parts may be reduced and, in particular, in the case in which the hand-shake prevention driving unit is disposed on the three sides, a balance may be achieved on the four sides of the camera module.

In addition, a main frame in which the autofocus driving unit is disposed may be provided as a separated-type frame or an integrated-type frame.

In addition, the hand-shake prevention driving unit may include coils and magnets corresponding to each other in the optical axis direction and disposed above and below the main frame in the optical axis direction.

BRIEF DESCRIPTION OF THE DRAWINGS

The above and other aspects, features and advantages of the present disclosure will be more clearly understood from the following detailed description taken in conjunction with the accompanying drawings, in which.

DETAILED DESCRIPTION

Figure 1:
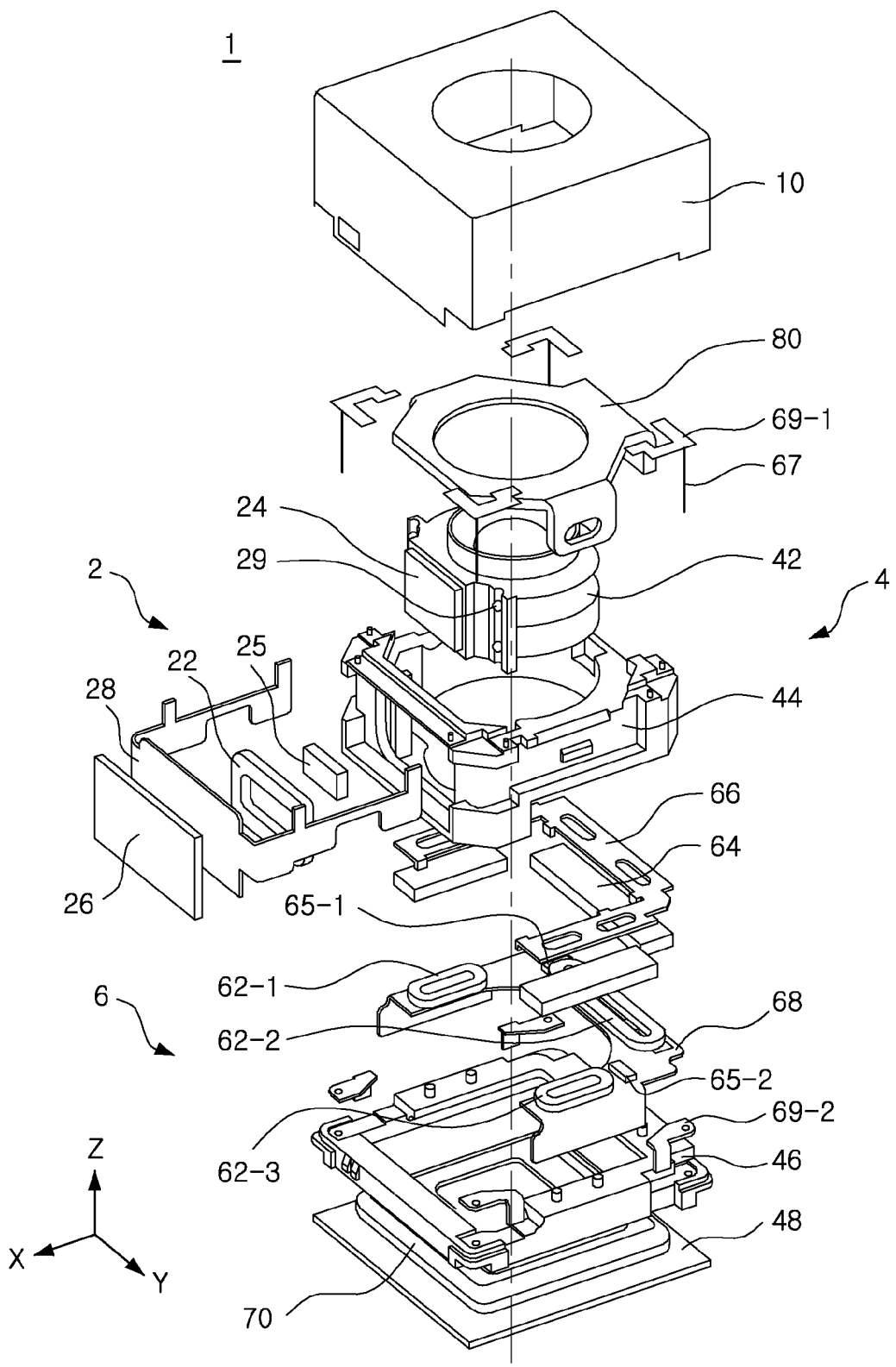
FIG. 1 is a schematic exploded perspective view illustrating a camera module according to an exemplary embodiment of the present disclosure.

Exemplary embodiments of the present disclosure will now be described in detail with reference to the accompanying drawings.

The disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

Camera Module and Lens Driving Device

Figure 2:
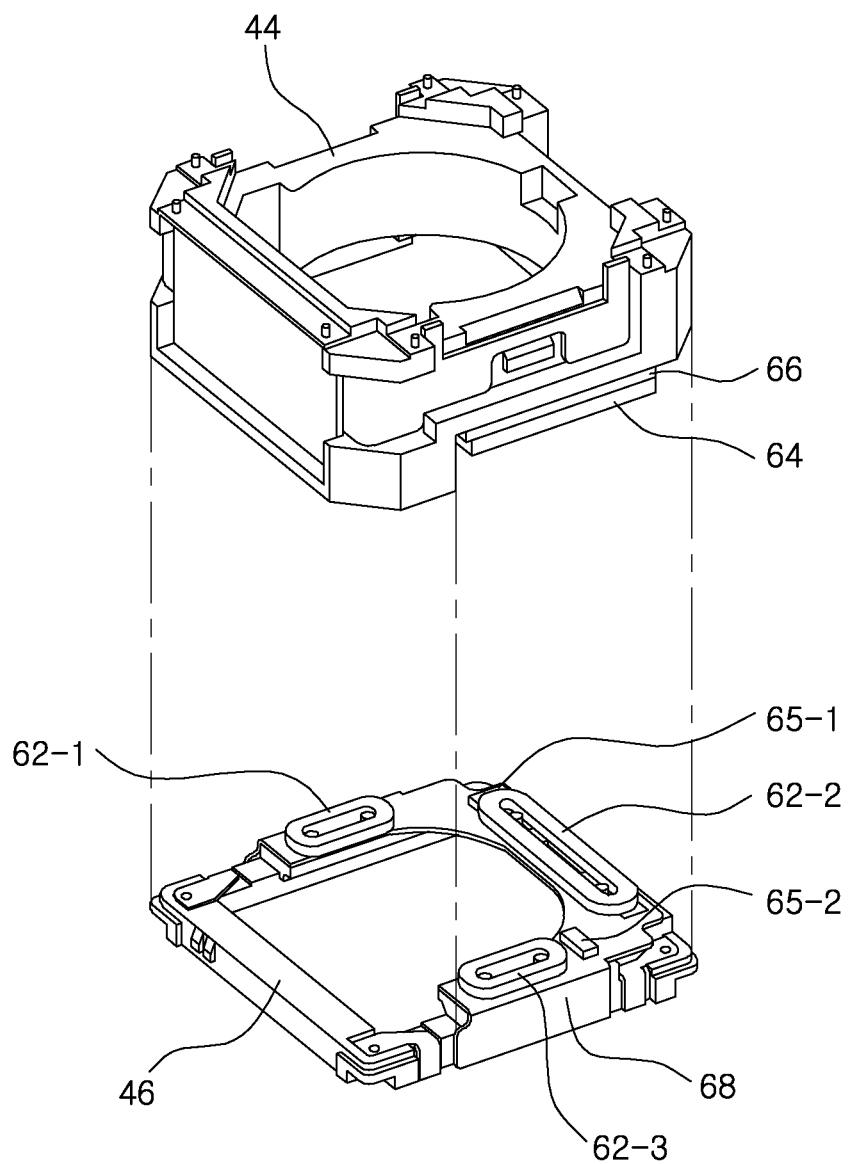
FIG. 2 is a schematic exploded perspective view illustrating an example of a layout of coils and magnets of a hand-shake prevention driving unit.
Figure 3:
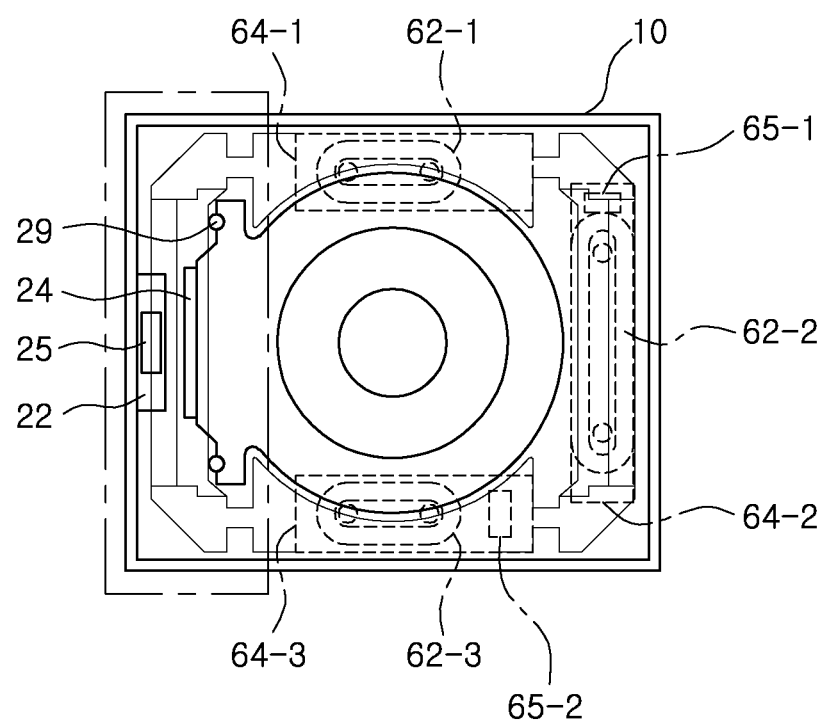
FIG. 3 is a schematic plan view illustrating a layout of an autofocus driving unit and the hand-shake prevention driving unit of FIG. 2.

FIG. 1 is a schematic exploded perspective view illustrating a camera module according to an exemplary embodiment of the present disclosure, FIG. 2 is a schematic exploded perspective view illustrating a layout of coils and magnets of a hand-shake prevention driving unit, and FIG. 3 is a schematic plan view illustrating a layout of an autofocus driving unit and the hand-shake prevention driving unit.

Referring to FIGS. 1 through 3, a camera module 1 according to an exemplary embodiment of the present disclosure may include a frame 4, an autofocus driving unit 2, and a hand-shake prevention driving unit 6.

Before describing specific components, directions of the camera module will be described in order to allow exemplary embodiments of the present disclosure to be clearly described. In FIG. 1, a Z direction refers to an optical axis direction along which light passes to be perpendicular to a lens L, while an X direction and a Y direction refer to directions (X and Y directions) representing a plane perpendicular to the optical axis direction.

The frame 4 may include a lens barrel 42, a main frame 44, an OIS mounting frame 46, and a lower frame 48. The frame 4 may form an exterior of the camera module 1 in combination with a shield case 10.

The lens barrel 42 may support the lens L or a group of lenses and may include the autofocus driving unit 2 formed on one side inside the camera module 1.

Here, the autofocus driving unit 2 may drive the lens L in the optical axis direction to allow an image formed on an image sensor 70 to be sharp. The autofocus driving unit 2, having a structure capable of moving the lens barrel 42 vertically, may use schemes such as a voice coil motor (VCM) scheme using electromagnetic force of a coil and a magnet, an ultrasonic motor scheme using a piezoelectric element, a scheme of driving the lens barrel 42 by applying a current to a wire of a shape memory alloy, and the like.

Hereinafter, exemplary embodiments of the present disclosure will be described based on the VCM scheme, but a scope of the present disclosure is not limited thereto.

The autofocus driving unit 2 according to an exemplary embodiment of the present disclosure may include a first coil 22, a first magnet 24, a first flexible printed circuit board (FPCB) 28, a first yoke 26, a first hall sensor 25, and a ball member 29.

In addition, the first magnet 24 may be formed on one side of the lens barrel 42 and correspond to the first coil 22 on the first FPCB 28 supported by the main frame 44.

The first hall sensor 25 may be disposed on an inner side of a winding of the first coil 22 to sense a magnetic flux change of the first magnet 24. The first hall sensor 25 may sense the magnetic flux change of the first magnet 24 to thereby transmit a signal to a driver IC for autofocus driving through the first FPCB 28.

Here, the first coil 22 is illustrated as a winding coil, but is not limited thereto. For example, the first coil 22 may be formed of a multilayer coil board.

The lens barrel 42 may be movably disposed inside the main frame 44 so as to be driven in the optical axis direction and may contact an inner surface of the main frame 44 for stable driving. In this case, a ball member 29 may be provided between a surface of the lens barrel 42 and a surface of the main frame 44 facing each other to prevent friction.

The OIS mounting frame 46 may be provided with the hand-shake prevention driving unit 6. Although the present exemplary embodiment describes a case in which the OIS mounting frame 46 is provided as an additional part separated from the main frame 44, the lower frame 48, the shield case 10, or the like is able to serve as the OIS mounting frame, as long as an OIS coil and a magnet may be mounted thereon.

The hand-shake prevention driving unit 6 may be used to correct blur of an image or shaking of a video due to factors such as the hand-shake of a photographer at the time of photographing the image and recording the video.

The driving scheme of the hand-shake prevention driving unit 6 is not particularly limited, similar to the autofocus driving unit 2, as long as the lens L may be driven in the X and Y directions.

The hand-shake prevention driving unit 6 may be disposed on sides of a plane perpendicular to the optical axis direction other than one side of the plane on which the autofocus driving unit 2 is disposed.

For example, the hand-shake prevention driving unit 6 may be disposed on three sides of the plane perpendicular to the optical axis direction and may be disposed to be symmetrical with respect to the autofocus driving unit 2 on the plane perpendicular to the optical axis direction.

The hand-shake prevention driving unit 6 disposed as described above may drive the lens in a direction perpendicular to the optical axis direction.

The hand-shake prevention driving unit 6 according to an exemplary embodiment of the present disclosure may drive the lens in the X and Y directions using a second magnet 64 supported by the main frame 44 and a second coil 62 formed on the OIS mounting frame 46.

The hand-shake prevention driving unit 6 may be disposed on three sides of the camera module 1 other than one side of the camera module 1 on which the autofocus driving unit 2 is disposed.

Since deviation of the main frame 44 is corrected in the direction perpendicular to the optical axis direction by the hand-shake prevention driving unit 6, deviation of the lens barrel 42 contacting the main frame 44 may also be corrected in the direction perpendicular to the optical axis.

In order to correct the deviation of the main frame 44 in the direction perpendicular to the optical axis direction, the main frame 44 needs to be floated while having an interval spaced apart from the fixed OIS mounting frame 46 in the optical axis direction.

One end of the main frame 44 may be fixed to a lower plate spring 69-2 and the other end thereof supported by a suspension wire 67 may be fixed to an upper plate spring 69-1.

The main frame 44 may be coupled to a stopper 80 so as to interfere with the lens barrel 42 to regulate a displacement in the optical axis direction of the lens barrel 42.

Three sides of a bottom surface of the main frame 44 may be provided with second magnets 64-1, 64-2 and 64-3 together with a second yoke 66. In addition, respective second coils 62-1, 62-2, and 62-3 may be disposed on the OIS mounting frame 46 such that they correspond to the second magnets 64-1, 64-2, and 64-3, having intervals to be spaced apart from the second magnets in the optical axis direction.

In the present exemplary embodiment, the second magnets and the second coils are disposed to face each other in a vertical direction based on the optical axis direction. However, the arrangement of the second magnets and the second coils may be easily changed such that the second magnets and the second coils face each other in a horizontal direction on the plane perpendicular to the optical axis direction.

Second hall sensors 65-1 and 65-2 may be disposed on a second FPCB 68 of the OIS mounting frame 46 to be adjacent to the second coils 62-2 and 62-3 to thereby sense a magnetic flux change of the second magnets 64-2 and 64-3. Two second hall sensors may be used to determine positions in the X and Y directions.

The second hall sensors 65-1 and 65-2 may sense the magnet flux change of the second magnets 64-2 and 64-3 to thereby transmit a signal to an OIS driver IC (not shown) through the second FPCB 68.

Another Example of Hand-Shake Prevention Driving Unit

Figure 4:
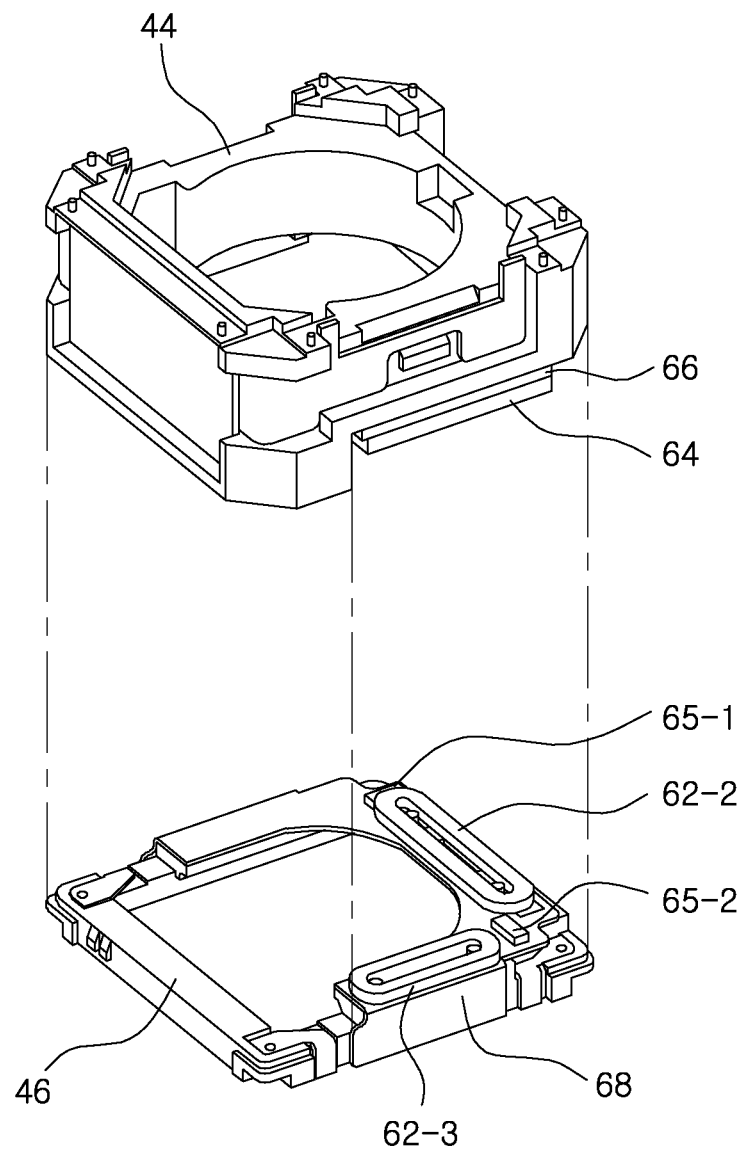
FIG. 4 is a schematic exploded perspective view illustrating another example of a layout of coils and magnets of a hand-shake prevention driving unit.
Figure 5:
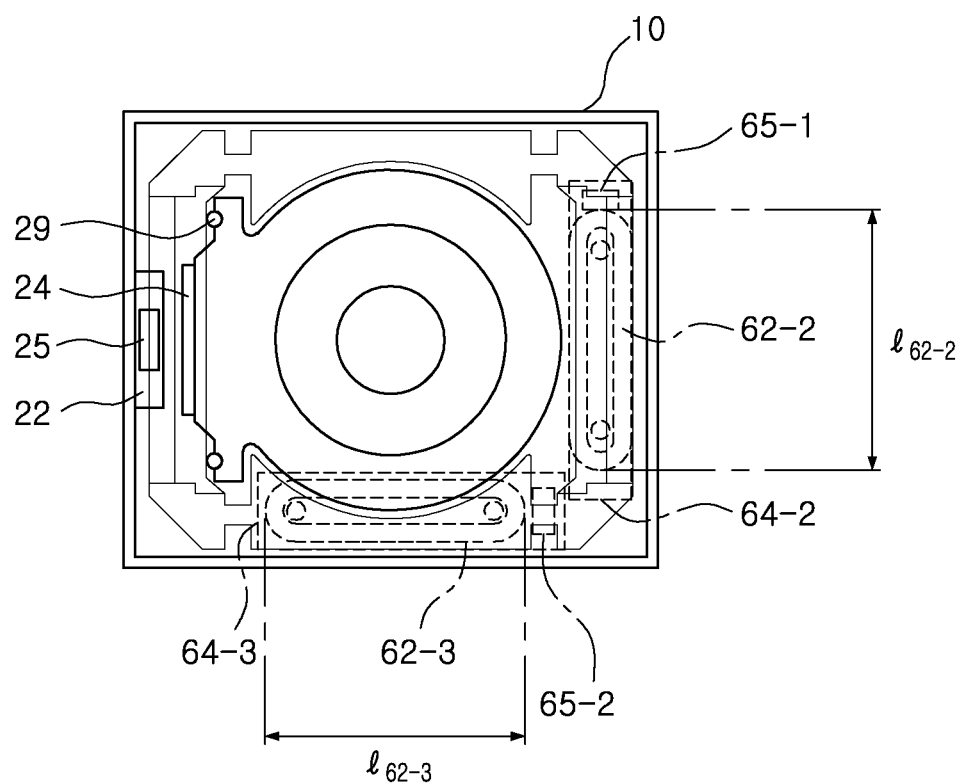
FIG. 5 is a schematic plan view illustrating a layout of an autofocus driving unit and the hand-shake prevention driving unit of FIG. 4.

FIG. 4 is a schematic exploded perspective view illustrating another example of a layout of coils and magnets of a hand-shake prevention driving unit and FIG. 5 is a schematic plan view illustrating a layout of an autofocus driving unit and the hand-shake prevention driving unit of FIG. 4.

Hereinafter, a description of portions different from the aforementioned hand-shake prevention driving unit 6 and portions which are not described will be provided.

The hand-shake prevention driving unit 6 may be disposed on two sides of the plane perpendicular to the optical axis direction other than one side of the plane on which the autofocus driving unit 2 is disposed, within the camera module.

For example, the second coil 62-3 and the second magnet 64-3 of the hand-shake prevention driving unit may be disposed on one side of the plane adjacent to the side thereof on which the first coil 22 and the first magnet 24 of the autofocus driving unit are disposed, and the second coil 62-2 and the second magnet 64-2 of the hand-shake prevention driving unit may be disposed on another side of the plane opposing the side thereof on which the first coil 22 and the first magnet 24 of the autofocus driving unit are disposed.

Here, the second hall sensors 65-1 and 65-2 sensing the magnet flux change of the second magnets 64-2 and 64-3 may be disposed outside the second coils 62-2 and 62-3 to be adjacent to the second coils 62-2 and 62-3.

In the case in which the hand-shake prevention driving unit is disposed on the two sides, there may be no substantial difference between respective lengths $l_{62\text{-}2}$ and $l_{62\text{-}3}$ of the coils 62-2 and 62-3.

Example of First FPCB of Autofocus Driving Unit

Figure 6:
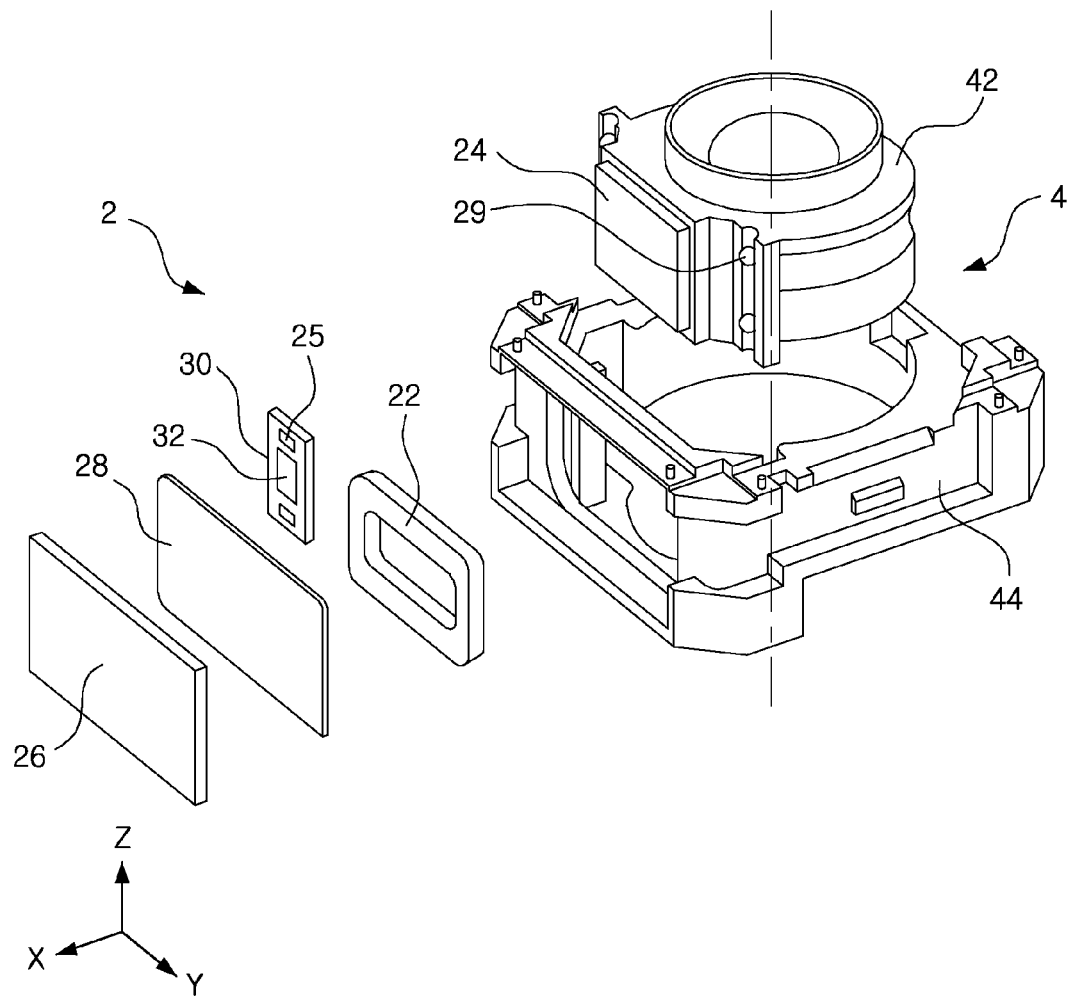
FIG. 6 is a schematic perspective view illustrating an example of a layout of a first hall sensor.

FIG. 6 is a schematic perspective view illustrating an example of a layout of a first hall sensor.

Referring to FIG. 6, the autofocus driving unit 2 may be disposed on one side of the main frame 44.

One side of the main frame 44 may be provided with the first FPCB 28 for mounting the first coil 22, and the first hall sensor 25 may be disposed outside the first coil 22 to be adjacent to the first coil 22 to thereby sense the magnetic flux change of the first magnet 24.

The first hall sensor 25 may be provided as a single chip 30 together with a driver IC 32 for driving the autofocus driving unit 2. In addition, the first hall sensor 25 may be disposed above and below the driver IC 32 in the optical axis direction. As the lens barrel 42 is moved vertically, the first hall sensor 25 may accurately determine the position of the lens barrel 42.

The chip 30 may also be disposed inside the first coil 22, provided that the first hall sensor 25 is disposed above and below the driver IC 32 in the optical axis direction.

Here, the first FPCB 28 of FIG. 6 will be compared with that of FIG. 1. The first FPCB 28 of FIG. 1 may provide a driving current to the autofocus driving unit 2 and may be extended from one side of the main frame 44 to the other two sides of the main frame 44 to thereby provide the driving current to the hand-shake prevention driving unit 6.

Although not shown, the first FPCB may be extended to one of the other two sides of the main frame and connected to the frame on which the hand-shake prevention driving unit 6 is mounted to thereby provide the driving current to the hand-shake prevention driving unit 6.

Meanwhile, the first FPCB 28 of FIG. 6 may only be disposed on one side of the main frame. Here, the first FPCB 28 may provide the driving current to the hand-shake prevention driving unit without being extended to the other sides of the main frame 44.

Ball Member

Figure 7:
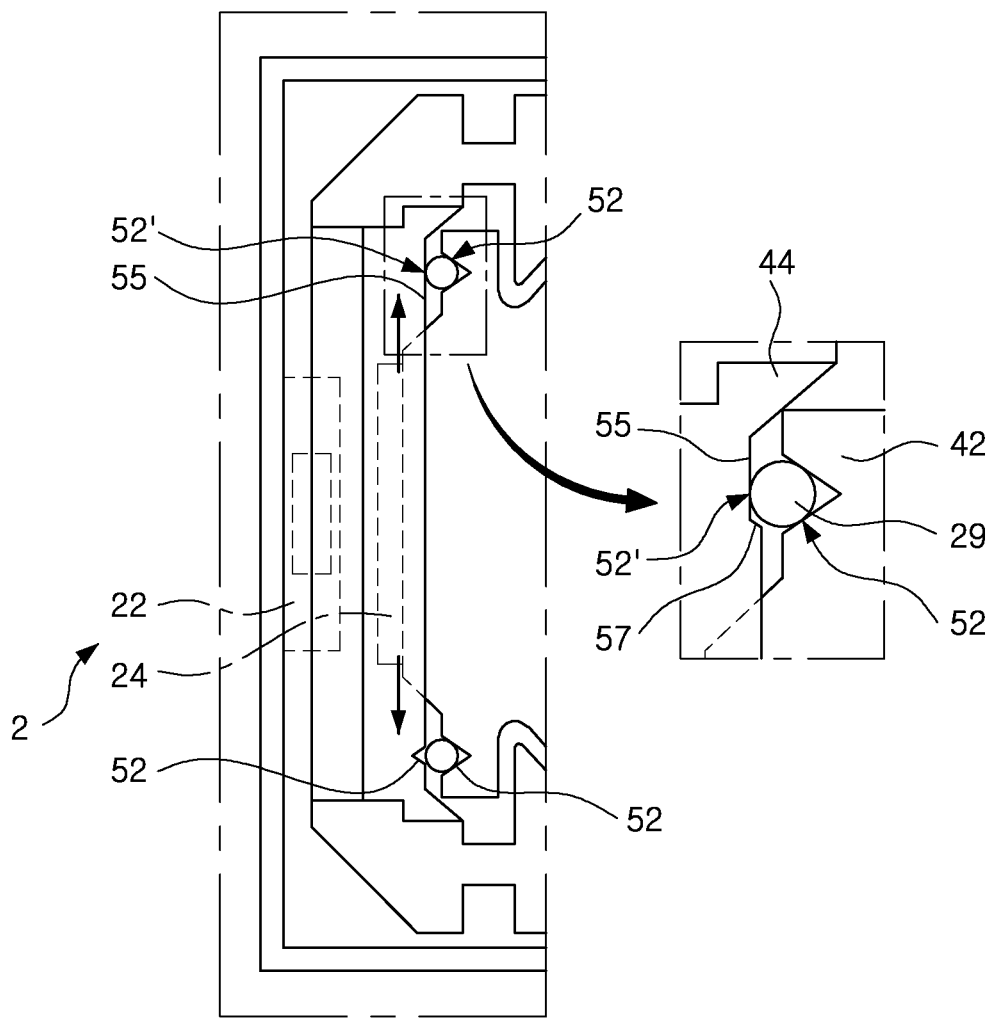
FIG. 7 is a schematic view illustrating an example of a form in which a ball member of the autofocus driving unit is mounted.
Figure 8:
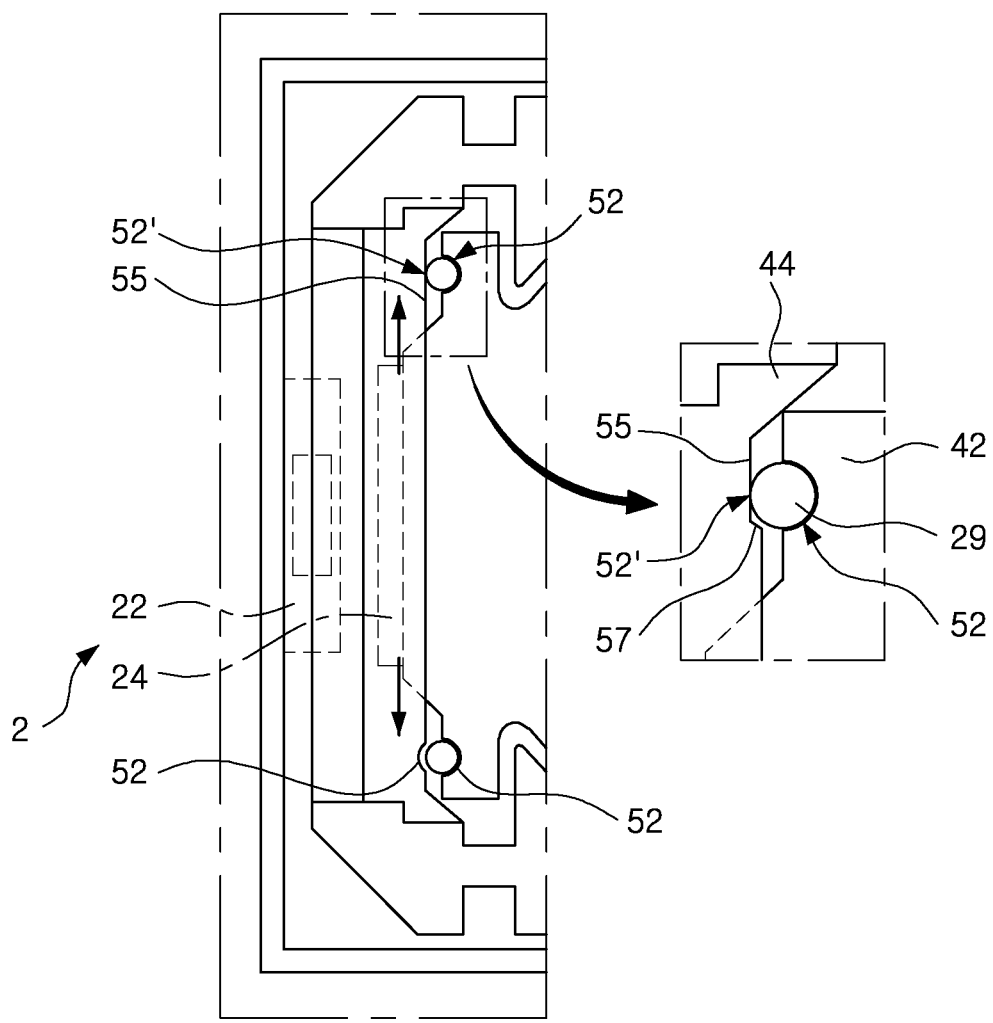
FIG. 8 is a schematic view illustrating another example of a form in which a ball member of the autofocus driving unit is mounted.

FIG. 7 is a schematic view illustrating an example of a form in which the ball member of the autofocus driving unit is mounted and FIG. 8 is a schematic view illustrating another example of a form in which the ball member of the autofocus driving unit is mounted.

Referring to FIGS. 7 and 8, the ball member 29 may be provided between a surface of the lens barrel 42 and a surface of the main frame 44 facing each other to prevent friction.

The ball member 29 may facilitate movement of the lens barrel 42 in the optical axis direction, and may be disposed on upper and lower portions of the outer surface of the lens barrel 42 facing the main frame based on the autofocus driving unit 2 (please see arrows '→').

Guide parts 52 and 52' regulating a movement range of the ball member 29 may be formed in the lens barrel 42 and the main frame 44, respectively, and a shape of the guide part 52 may be different from that of the other guide part 52'.

The guide part 52 of FIG. 7 may be formed as a V-like groove, and the guide part 52 of FIG. 8 may be formed as a U-like groove. A shape of the guide part 52' is not particularly limited as long as it is different from the shape of the guide part 52.

In the case in which the shape of the guide part 52' is different from that of the guide part 52, a separation of the ball member 29 may be prevented while the lens barrel is vertically moved for autofocusing.

The guide part 52' may have a flat surface 55 or a flat surface 55 connected to an inclined portion 57.

Figure 9:
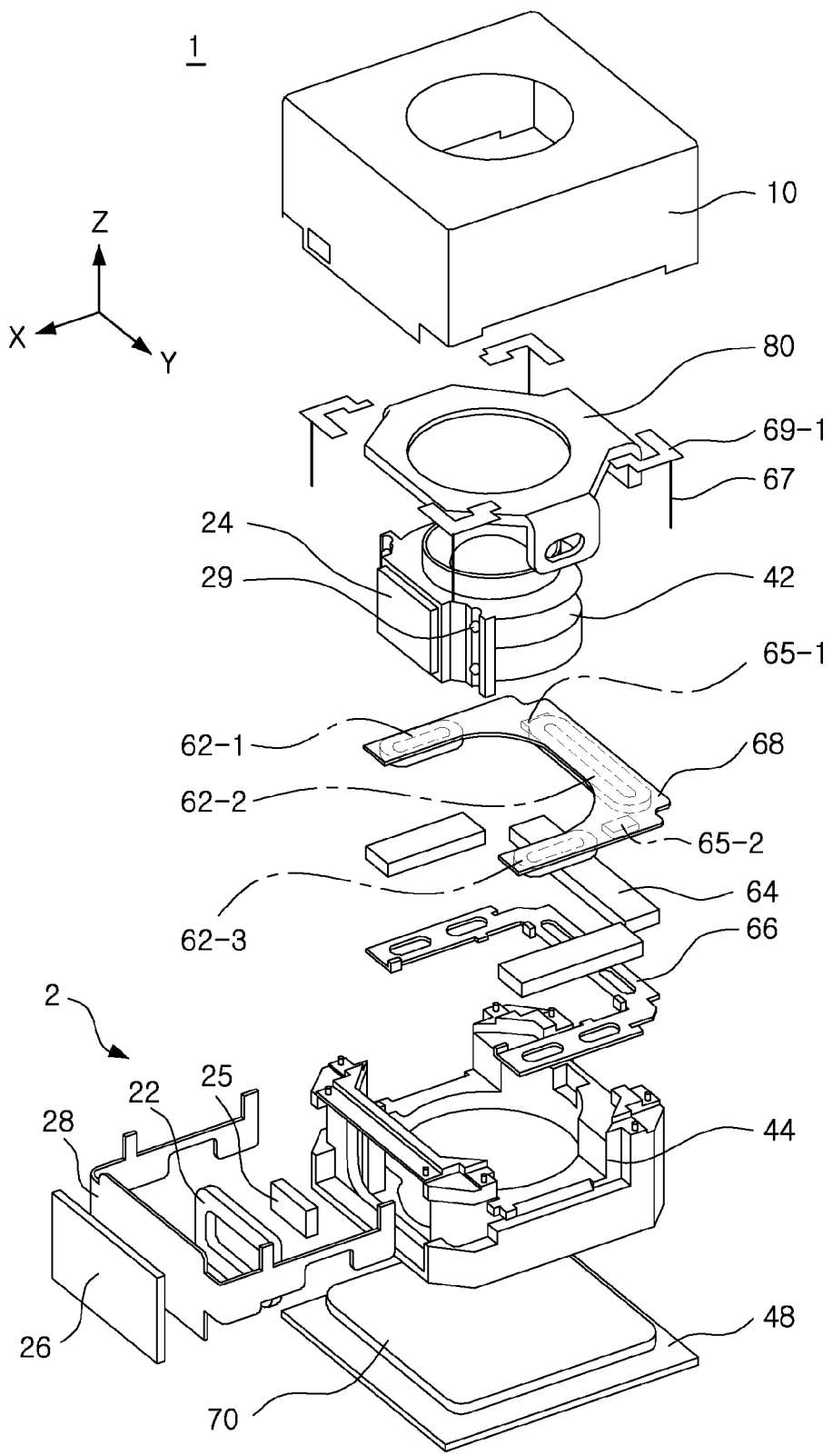
FIG. 9 is a schematic exploded perspective view illustrating another example of a layout of coils and magnets of a hand-shake prevention driving unit.

Modified Example of Layout of Coils and Magnets of Hand-Shake Prevention Driving Unit FIG. 9 is a schematic exploded perspective view illustrating another example of a layout of coils and magnets of a hand-shake prevention driving unit.

Referring to FIG. 1, FIG. 1 illustrates that the second magnet 64 disposed below the main frame 44 and the second coil 62 mounted on the second FPCB 68 are disposed to face each other in the optical axis direction.

Unlike the configuration of FIG. 1, FIG. 9 illustrates that the second magnet 64 disposed above the main frame 44 and the second coil 62 disposed below the second FPCB 68 are disposed to face each other in the optical axis direction.

The second FPCB 68 of FIG. 9 may be mounted in the shield case 10 or the stopper 80 to allow the second coil 62 and the second magnet 64 to face each other in the optical axis direction.

Another Example of Autofocus Driving Unit

Figure 10:
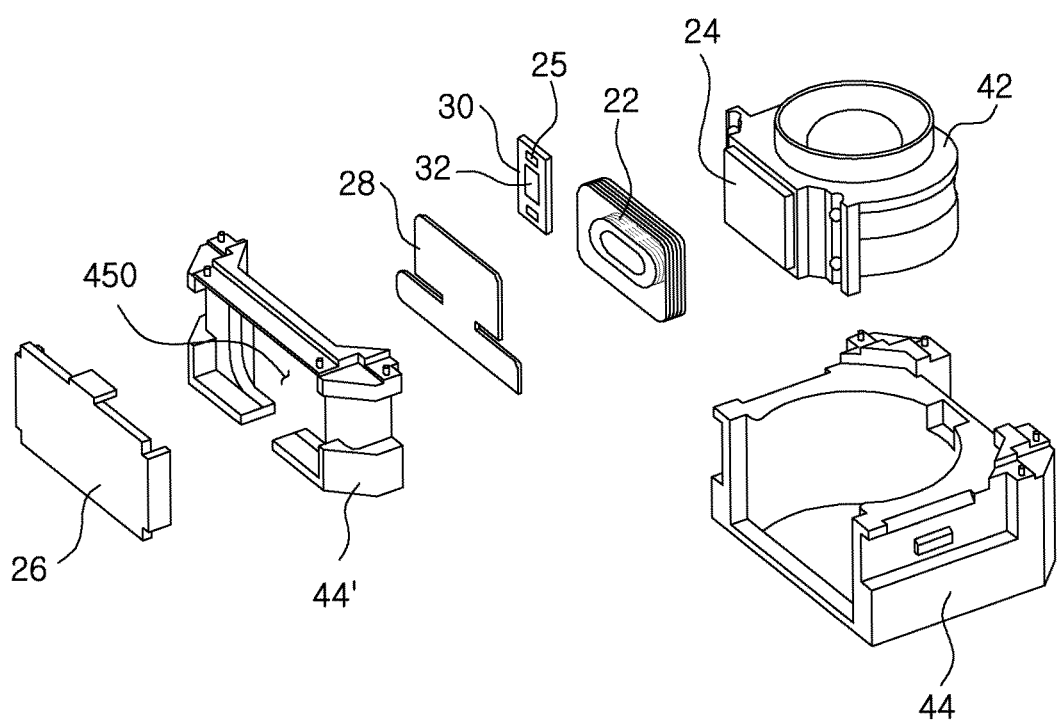
FIG. 10 is a schematic exploded perspective view illustrating another example of the autofocus driving unit.

FIG. 10 is a schematic exploded perspective view illustrating another example of the autofocus driving unit.

Referring to FIG. 10, the main frame 44 may not be an integral structure and may be coupled to a separate frame 44'.

The main frame 44 and the separate frame 44' may be disposed to allow the lens barrel 42 to move, and the coil 22 and the magnet 24 of the autofocus driving unit may be disposed on one side in which the main frame 44 and the separate frame 44' are coupled to each other.

The separate frame 44' may have an opening 450, wherein the first FPCB 28, and the first coil 22 and the first hall sensor 25 connected to the first FPCB 28 may be disposed in the opening 450.

The opening 450 may be covered by the yoke 26. The first magnet 24 may be disposed on one side of the lens barrel 42 or one side of the separate frame 44' corresponding to one side of the lens barrel 42, while the first coil 22 may be disposed in like manner. The first magnet 24 may be disposed on one side of the lens barrel 42 and the first coil 22 may be disposed on one side of the separate frame 44', or vice versa. In FIG. 10, the first coil 22 is disposed on one side of the separate frame 44' and the first magnet 24 is disposed on one side of the lens barrel 42.

The first FPCB 28 may be coupled to the yoke 26 through the opening 450 and the first coil 22 may be mounted on the first FPCB 28. Here, the first coil 22 may be a winding coil or a multilayer coil board.

The first hall sensor 25 together with the driver IC may be provided as a single chip 30, and may be disposed above and below the driver IC 32 in the optical axis direction for the autofocus driving. The first hall sensor 25 may be disposed above the driver IC 32 or below the driver IC 32 in the optical axis direction.

In addition, the first FPCB 28 may only be disposed on one side of the separate frame 44' to thereby provide the driving current to the hand-shake prevention driving unit.

Application Form in Electronic Device

Figure 11:
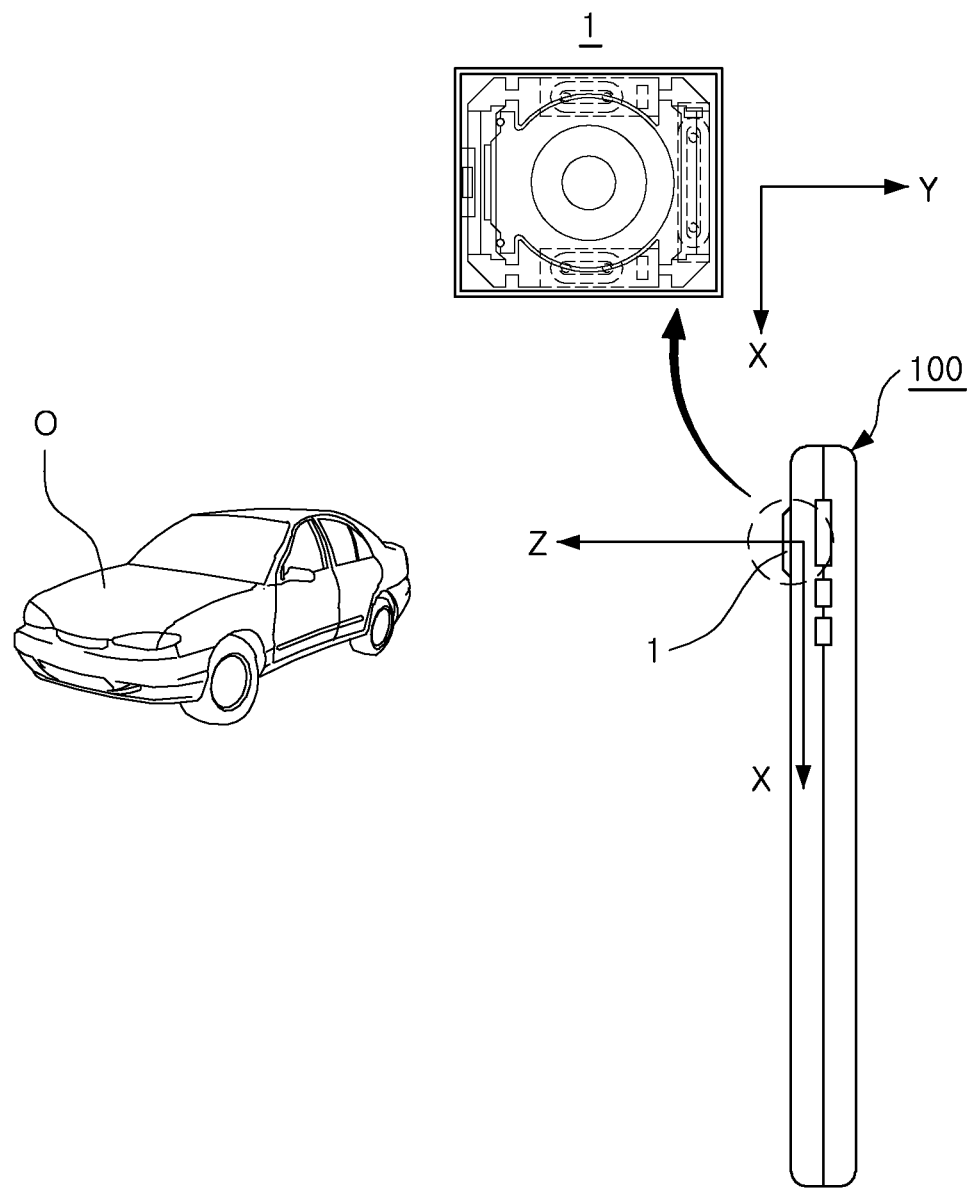
FIG. 11 is a photographing form using a camera module according to an exemplary embodiment of the present disclosure.
Figure 12A:
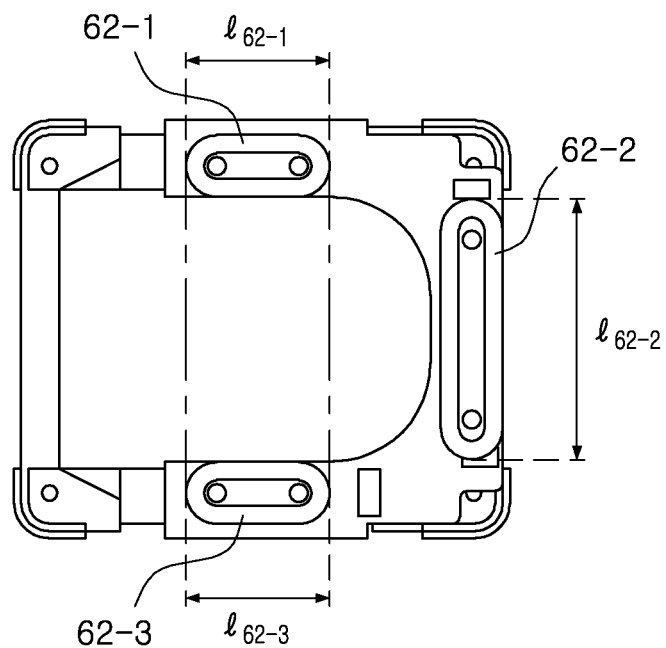
FIGS. 12A and 12B are schematic views illustrating the coils of the hand-shake prevention driving unit considering gravity from the photographing form of FIG. 11.
Figure 12B:
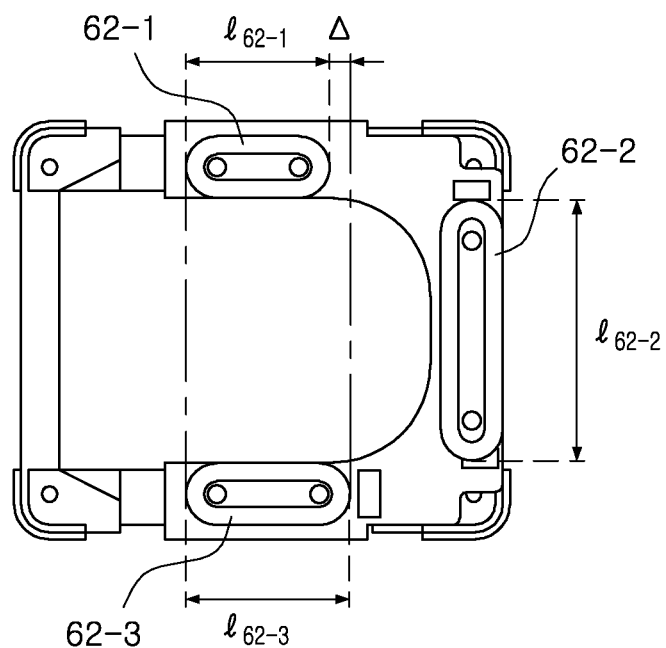

FIG. 11 is a photographing form using a camera module according to an exemplary embodiment of the present disclosure and FIGS. 12A and 12B are schematic views illustrating the coils of the hand-shake prevention driving unit considering gravity from the photographing form of FIG. 11.

Referring to FIG. 11, in the case in which an object is photographed using an electronic device 100 to which the camera module 1 is applied, when the photograph is taken with the electronic device 100 held in hand, deviation may occur in advance in a direction perpendicular to the optical axis due to gravity acting on inner driving units of the camera module 1 as well as the hand-shake.

Therefore, the total length of the second coils 62-1 and 62-3 of the hand-shake prevention driving unit arranged in a gravity direction may be set to be longer than a length of the second coil 62-2 in a direction perpendicular to the gravity direction, such that the hand-shake prevention driving unit may be more easily driven.

FIG. 12A illustrates that the two coils 62-1 and 62-3 disposed in the gravity direction have the same length, and FIG. 12B illustrates that the two coils 62-1 and 62-3 disposed in the gravity direction have different lengths.

The sum of the lengths $l_{62-1}$ and $l_{62-3}$ of the two coils 62-1 and 62-3 disposed in the gravity direction according to the exemplary embodiments of FIGS. 12A and 12B is longer than the length $l_{62-2}$ of the second coil 63-2 disposed in the direction perpendicular to the gravity direction. The length $l_{62-2}$ of the second coil 63-2 perpendicular to the gravity direction may be set to be longer than the lengths $l_{62-1}$ and $l_{62-3}$ of the two coils 62-1 and 62-3 in the gravity direction, thereby balancing the lengths.

As set forth above, in the lens driving device and the camera module including the same according to exemplary embodiments of the present disclosure, the autofocus driving unit may be disposed on one side of the lens barrel and the hand-shake prevention driving unit may be disposed on the other sides of the lens barrel when viewed in the direction perpendicular to the optical axis, whereby the number of parts may be decreased and the hand-shake prevention function may be stably implemented.

In addition, in the case in which the autofocus driving unit is disposed on one side of the camera module and the hand-shake prevention driving unit is disposed on the other three sides of the camera module when viewed in the direction perpendicular to the optical axis, the lens driving device may be wholly balanced.

In addition, the lengths of the coils disposed on the two sides opposing each other may be different from the length of the coil disposed on the remaining one side, such that force capable of driving the camera module in the direction perpendicular to the optical axis may be different. Thereby, deviation in the direction perpendicular to the optical axis, generated by gravity when taking a photograph with the electronic device using the camera module, may also be corrected.

While exemplary embodiments have been shown and described above, it will be apparent to those skilled in the art that modifications and variations could be made without departing from the spirit and scope of the present disclosure as defined by the appended claims.

What is claimed is:

1. A lens driving device, comprising:
a main frame;
a lens barrel movably disposed in the main frame and configured to support a lens;
an autofocus driving unit configured to drive the lens barrel in an optical axis direction based on the lens barrel, including a first magnet and a first coil both disposed at a first side of a four-sided reference plane perpendicular to the optical axis direction;
a hand-shake prevention driving unit disposed at sides of the reference plane other than said first side thereof and configured to drive the lens in a direction perpendicular to the optical axis direction;
an optical image stabilization (OIS) mounting frame aligned with the main frame in the optical axis direction; and
a shield case configured to accommodate the main frame and the OIS mounting frame therein.

2. The lens driving device of claim 1, wherein:
the first magnet is disposed on the lens barrel, and
the first coil is disposed on the main frame, or vice versa.

3. The lens driving device of claim 2, wherein the first coil and the first magnet are disposed adjacent to an opening formed in the main frame.

4. The lens driving device of claim 2,
wherein a first side of the main frame, which corresponds to the first side of the reference plane, is provided with a first flexible printed circuit board (FPCB) configured to mount the first coil, and
wherein a first hall sensor configured to sense a magnetic flux change of the first magnet is disposed inside a winding of the first coil, or is disposed to be adjacent to the first coil outside the first coil.

5. The lens driving device of claim 4, wherein the first hall sensor is provided as a single chip together with a driver integrated circuit (IC) configured to drive the autofocus driving unit.

6. The lens driving device of claim 5, wherein the first hall sensor is disposed above and below the driver IC, or is disposed above the driver IC or below the driver IC in the optical axis direction.

7. The lens driving device of claim 4, wherein the first FPCB is extended from the first side of the main frame to at least one adjacent side of the main frame, and is configured to provide a driving current to the hand-shake prevention driving unit.

8. The lens driving device of claim 4, wherein the first FPCB is disposed only on the first side of the main frame.

9. The lens driving device of claim 1, further comprising:
a ball member disposed on a surface of the lens barrel facing the main frame and facilitating a movement of the lens barrel in the optical axis direction.

10. The lens driving device of claim 9,
wherein the ball member is disposed on upper and lower portions of the outer surface of the lens barrel facing the main frame, based on the autofocus driving unit;
wherein the lens barrel and the main frame are provided with respective guide parts regulating a movement range of the ball member; and
wherein a shape of one guide part is different from that of the other guide part.

11. The lens driving device of claim 10,
wherein one guide part is provided as a V-like groove or an U-like groove, and
wherein the other guide part includes a flat surface or a flat surface connected to an inclined portion.

12. A lens driving device, comprising:
a main frame;
a lens barrel movably disposed in the main frame and configured to support a lens;
an autofocus driving unit configured to drive the lens barrel in an optical axis direction based on the lens barrel, including a first magnet and a first coil both disposed at a first side of a four-sided reference plane perpendicular to the optical axis direction;
a hand-shake prevention driving unit disposed at sides of the reference plane other than said first side thereof and configured to drive the lens in a direction perpendicular to the optical axis direction;
a separate frame having an opening and coupled to a side of the main frame; and
a yoke configured to cover the opening in the separate frame;
wherein the first magnet is disposed on the lens barrel, and the first coil is disposed on the separate frame, or vice versa.

13. The lens driving device of claim 12, wherein the opening in the separate frame receives a first flexible printed circuit board (FPCB) coupled to the yoke, and the first coil and a first hall sensor are coupled to the first FPCB.

14. The lens driving device of claim 13, wherein the first hall sensor is provided as a single chip together with a driver integrated circuit (IC) configured to drive the autofocus driving unit.

15. The lens driving device of claim 14, wherein the first hall sensor is disposed above and below the driver IC, or is disposed above the driver IC or below the driver IC in the optical axis direction.

16. The lens driving device of claim 13, wherein the first FPCB is disposed on one side of the separate frame, and is configured to provide a driving current to the hand-shake prevention driving unit.

17. The lens driving device of claim 12, wherein the first coil includes a winding coil or a multilayer coil board.

18. The lens driving device of claim 1,
wherein the hand-shake prevention driving unit includes sets of second magnets and second coils disposed above or below the main frame with reference to the optical axis direction, and
wherein the second magnets are disposed to face their respective second coils in the optical axis direction.

19. The lens driving device of claim 18,
wherein the hand-shake prevention driving unit includes three sets of second magnets and second coils disposed at three sides of the reference plane other than said first side thereof, and
wherein the second magnets are longer than the second coils in order to cover the second coils, and second hall sensors are disposed adjacent to respective second coils when viewed in the optical axis direction.

20. The lens driving device of claim 19, wherein one of the three second coils is longer than at least one of the other two second coils.

21. The lens driving device of claim 19, wherein one of the three second coils is longer than the sum of the lengths of the other two second coils.

22. The lens driving device of claim 19, wherein one second coil faces the autofocus driving unit and is longer than at least one of the other two second coils adjacent to the autofocus driving unit.

23. A camera module comprising:
a main frame;
a lens barrel movably disposed in the main frame and configured to support a lens;
an autofocus driving unit configured to drive the lens barrel in an optical axis direction based on the lens barrel, including a first magnet and a first coil both disposed at a first side of a four-sided reference plane perpendicular to the optical axis direction, the first magnet disposed on the lens barrel and the first coil disposed on the main frame, or vice versa;
a hand-shake prevention driving unit disposed at three sides of the reference plane other than said first side thereof and configured to drive the lens in a direction perpendicular to the optical axis direction;
an image sensor aligned with the lens barrel along the optical axis;
an optical image stabilization (OIS) mounting frame aligned with the main frame in the optical axis direction; and
a shield case configured to accommodate the main frame and the OIS mounting frame therein;
wherein the hand-shake prevention driving unit includes at least two second magnets disposed on at least two sides of the OIS mounting frame, and at least two corresponding second coils disposed on at least two sides of the main frame adjacent to the at least two sides carrying the second magnets, or vice versa.

24. The camera module of claim 23,
wherein the hand-shake prevention driving unit includes three second magnets disposed on three sides of the OIS mounting frame and three corresponding second coils disposed on three sides of the main frame, or vice versa, and wherein the second magnets are longer than the second coils in order to cover the second coils, and second hall sensors are disposed adjacent to second coils when viewed in the optical axis direction.

25. The camera module of claim 24, wherein one of the three second coils is longer than at least one of the other two second coils.

26. The camera module of claim 24, wherein one of the three second coils is longer than the sum of lengths of the other two second coils.

* * * * *